United States Patent [19]

Gariglio

[11] Patent Number: 5,269,089
[45] Date of Patent: Dec. 14, 1993

[54] WEED GUARD FOR FISH HOOKS

[76] Inventor: Barry Gariglio, 2251 N.W. 40th Terrace, Coconut Creek, Fla. 33060

[21] Appl. No.: 978,328

[22] Filed: Nov. 18, 1992

[51] Int. Cl.⁵ .................................... A01K 85/00
[52] U.S. Cl. ........................... 43/42.43; 43/43.6
[58] Field of Search ............ 43/42.43, 43.6, 42.4, 43/42.42, 43.2, 43.4

[56] References Cited

U.S. PATENT DOCUMENTS

| | | | |
|---|---|---|---|
| 2,462,437 | 2/1949 | Tallaksen | 43/42.43 |
| 2,932,114 | 5/1960 | Meucci | 43/43.6 |
| 3,020,667 | 2/1962 | Lamar | 43/42.43 |
| 3,389,490 | 6/1968 | Peters et al. | 43/42.43 |

FOREIGN PATENT DOCUMENTS 1295573 5/1962 France ................. 43/42.43

Primary Examiner—Mark Rosenbaum
Assistant Examiner—James Miner
Attorney, Agent, or Firm—Malin, Haley, DiMaggio & Crosby

[57] ABSTRACT

A molded, plastic guard for use in combination with a baited fishing hook to prevent snagging or fouling from underwater vegetation. The guard of the instant invention is a funnel-shaped device with an enlarged proximal end for securing the barb of the fishing hook in a fixed position. A V-shaped slot opposite a barb detent centers the shank of a fish hook forcing the barb into a desired position. The distal end of the guard is used to bias against the body of the bait to maintain the bait in a parallel plane to the fish hook, further providing an uninterrupted guide between the bait and the tip of the hook. Once installed, the guard is only dislodged by an upward force as provided when a fish takes the hook.

8 Claims, 1 Drawing Sheet

U.S. Patent  Dec. 14, 1993  5,269,089

WEED GUARD FOR FISH HOOKS

BACKGROUND OF THE INVENTION

1. Field of the Invention

The present invention relates generally to the field of sport fishing and, more particularly, to a fish hook guard to prevent snagging or fouling of the fish hook from underwater vegetation.

2. Description of the Prior Art

Fishing is a sport activity to some and a livelihood to others. Whatever the reason for fishing, those who are familiar with the activity realize the problems that occur when a baited hook is drawn through underwater vegetation along the bottom of a water bed. The problem with the unprotected hook is that it is frequently fouled by weeds or accidentally becomes snagged on an underwater log or the like obstacle. A major snag will cost the fisherman his bait, hook and any other lure that may be attached thereto. If the hook is simply fouled with weeds, the fisherman is making a wasted effort as the weed will conceal the bait, preventing any type of fish activity. Some types of fishing require all trolling to be performed in heavily vegetated areas which results in the hook being fouled instantly upon placement in the water. The time required to retrieve the baited hook and clear the weeds is not only time consuming, but very disruptive to the art of trolling for fish.

There have been numerous efforts to alleviate this situation in the past, some of which are described below.

U.S. Pat. No. 4,796,378, issued to Crueger, discloses a molded plastic week guard that is used to cover a multi-hook fishing device, wherein the apparatus provides a biased cover to each of the hooks. The problem with the plastic hook cover is that it is costly to manufacture and can only be used on a multi-prong hook. Further, the device cannot be removed and placed on other fishing devices. Crueger further discloses a one piece hook having a flexible hook guard that can be placed either above or below the barb. This embodiment also fails to provide a device that can be transferred to other fishing hooks and requires the fisherman to use the particular lure with the weed guard molded directly thereon.

U.S. Pat. No. 3,562,948, issued to Santo, discloses a weedless fish hook which engages the totality of the hook from the end of the shank near the tie portion to the underlying portion of the barb. The problem with the Santo device is that it prohibits the use of conventional bait and is limited to bait that can reside on the bottom portion of the hook.

U.S. Pat. No. 4,597,216, issued to Borshol, discloses a fish hook protector that is formed in the shape of a V-shaped cros sectional shield encompassing both sides of the barb portion of the hook. The shield completely eliminates the possibility of adding any type of bait onto a hook.

U.S. Pat. No. 4,777,758, issued to Phillips, discloses a complicated fishing lure having a body with a hook depending therefrom and a means for covering the hook by use of a V-shaped guard extending from the body portion. The device requires the fisherman to use the particular fishing lure which may not be acceptable to the type of fishing anticipated.

U.S. Pat. No. 2,586,162, issued to Hayden, discloses a weed guard for fish hooks which is formed from a wire shaped in the form of an "I" at one end which is adaptable to slip over the barb of the fish hook biasing the wire in an outward mode to eliminate weeds from catching the hook unless a downward force is produced.

U.S. Pat. No. 2,185,507, issued to Knapp, also discloses a fish hook guard based upon a guard which is carried by the hook and protects the sharp point of the hook from snagging.

U.S. Pat. No. 1,191,031, issued to Peters, employs an elastic band between the I-hook of a conventional fish hook and the barb which provides a biasing effect that is overcome when the fish swallows the hook.

U.S. Pat. No. 2,651,134, issued to Kemmerer, also discloses a conventional fish hook utilizing a resilient guard member such as a rubber band to bridge the gap between the I-hook of the shank and the barb.

The problem with all of the above prior art is that the weed guard is permanently coupled to the shank of the hook, severely limiting the type of bait that can be used and complicating all other bait placement. Therefore, what is needed in the art is a weed guard that works in conjunction with a baited hook, wherein the barb of the hook is covered without interfering with the size of the bait chosen for the particular usage.

SUMMARY OF THE INVENTION

The instant invention solves the aforementioned problems by providing a separate weed hook guard that is placed on the fishing hook after the bait has been attached. The guard is a molded plastic member having a funnel-shaped end to accommodate the barb portion of a hook extending to an angular bend which narrows to a point for biasing against the body of the bait previously attached to the hook. A V-shaped slot is provided opposite to a barb detent cavity for aligning the fish hook in a single position to prevent forward shifting of the hook. A detent shoulder is provided which prevents the fish hook from dislodging in a rearward direction, leaving the only method of dislodgement as an upward force as produced by a fish when it swallows the hook. The distal end of the guard biases against the body of the bait, which helps maintain the bait in a parallel plane to provide an uninterrupted guide path between the body of the bait and the tip of the fish hook.

Accordingly, an objective of the instant invention is to provide a one-piece, inexpensive fishing hook guard that is placed on the fish hook after the hook has been baited.

It is another object of the instant invention to provide a fishing hook guard which can be readily removed when it is not required and allows for the infinite replacement of bait on a single fish hook.

Other objects and advantages of this invention will become apparent from the following description taken in conjunction with the accompanying drawings. The drawings constitute a part of this specification and include exemplary embodiments of the present invention and illustrate various objects and features thereof.

In accordance with these and other objects which will be apparent hereinafter, the instant invention will now become described with particular reference to the accompanying drawings.

DESCRIPTION OF THE PREFERRED EMBODIMENTS

As required, detailed embodiments of the present invention are disclosed herein, however, it is to be understood that the disclosed embodiments are merely exemplary of the invention which may be embodied in various forms. Therefore, specific functional and structural details disclosed herein are not to be interpreted as limiting, but merely as a basis for the claims and as a representative basis for teaching one skilled in the art to variously employ the present invention and virtually any appropriately detailed structure.

Figure 1:
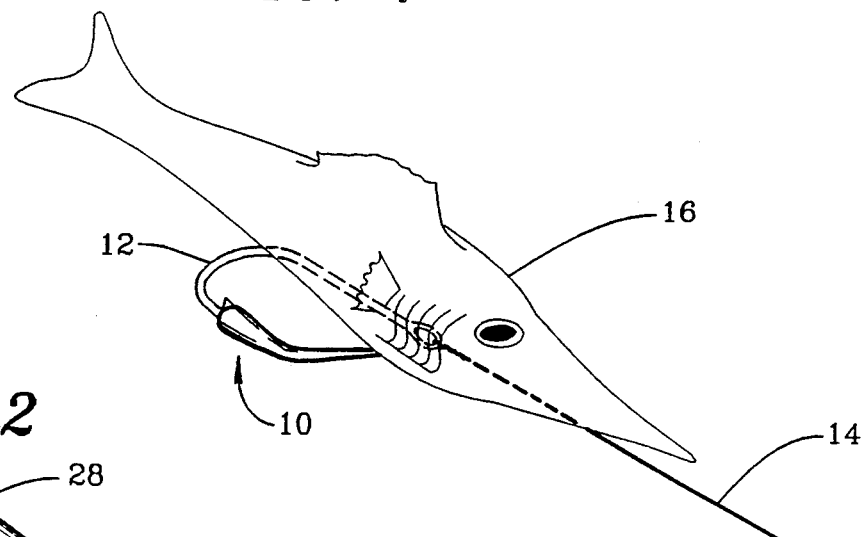
FIG. 1 is a perspective view of a baited fish hook with the guard of the instant invention attached thereto.

Now referring to FIG. 1, shown is a molded plastic guard 10 for use in combination with a fishing hook 12 which is attached to fishing line 14. Placement of bait 16 on the hook 12 is required for guard operation, whereby the guard 10 provides a continuous and uninterrupted line from a surface of the bait 16 to the tip of the hook 12 to prevent snagging or fouling when the bait is dragged through underwater vegetation. The guard 10 is actually a separate component of the hook, allowing all but the point and barb of the hook to be hidden by the bait 16. As further described hereinafter, the barb of the hook is allowed to fit snugly into the guard with slight overlapping sides, thus allowing no movement of the guard except upward for release. Thus, the guard can be moved upward by a physical force such as the fisherman's removal of the guard or preferably when the fish swallows the bait which will provide sufficient pressure to overcome the biasing of the guard, allowing the hook to be used in its ordinary and conventional fashion. The bait 16 acts as a foundation for a distal end of the guard to stabilize its alignment, while at the same time allowing for natural movement of the hook 12 from side to side due to the water pressure when the hook is pulled through the water. The guard allows the bait 16 to naturally flow over any surface or object found on the surface of the water or vegetation thereunder.

Figure 2:
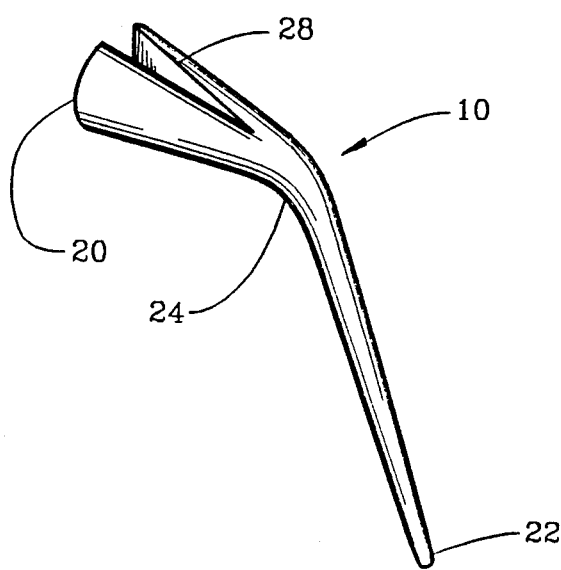
FIG. 2 is a perspective view of the guard illustrating the V-shaped slot and angular bend.

Now referring to FIG. 2, the guard 10 is an elongated homogenous tube of molded, resilient, plastic material shaped into the form of a funnel member having a proximal end 20 and a distal end 22. The two ends are separated by a predetermined length with an angular bend 24 therebetween. The angular bend 24 allows the proximal end portion of the guard 10 to maintain the hook in a substantially parallel relation to the bait 16. The distal end includes a slope of between 20° and 60° from the horizontal, preferably 40°, providing a means for deflection of vegetation. The distal end 22 is reduced to a narrow point, allowing an increase in the deflection area of the bait or insertion into the body of the bait. The proximal end 20 includes a first diameter having a substantially V-shaped slot 28 for insertion of the shank of the hook 12, and for alignment of the barb into a detent area as described later in the specification.

Figure 3:
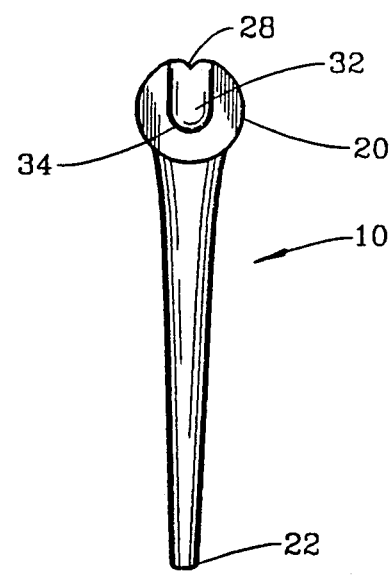
FIG. 3 is an end view of the guard of the instant invention.
Figure 4:
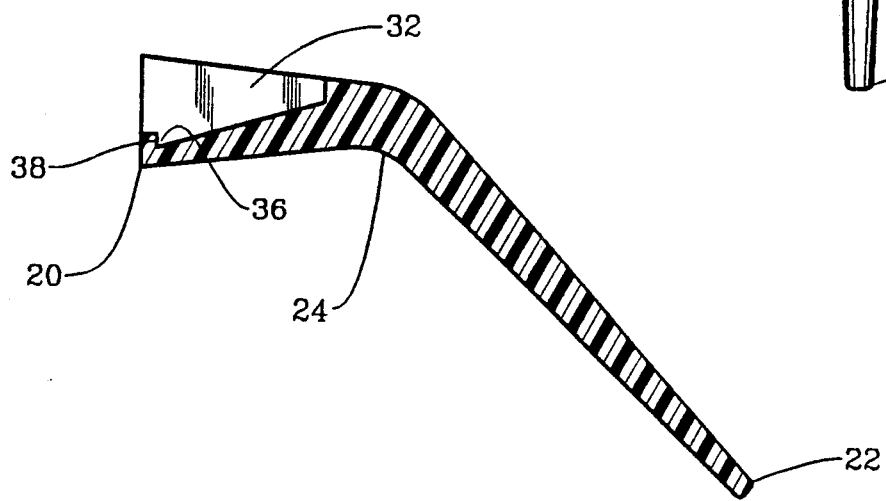
FIG. 4 is a cross sectional side view of the guard.

Now referring to FIGS. 3 and 4, the guard 10 includes a cavity 32 disposed in the proximal end 20 for insertion of a hook. The cavity 32 has a bottom wall 34 and a barb detent location 36. The slot 28 aligns the shank of a conventional hook, forcing the barb of the conventional hook into the barb detent 36 location. Slot 28 prevents dislodgement of the hook in a forward position and upright shoulder 38 frictionally engages the end of the barb to prevent dislodgement in a rearward direction. Installation of the guard requires that the hook be baited, wherein the fisherman can simply place the bait on the end of the hook, wherein the alignment slot places the shank in a predetermined position and allowing the barb to fit within the barb detent. The distal end of the guard is then biased against the body of the bait, allowing the fisherman to use the baited hook in its ordinary manner. Removal of the guard can be performed simply by placing an upward pressure on the guard to dislodge the barb from the barb detent position.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A fishing hook guard for use in combination with a baited fishing hook, said guard comprising:
    an elongated funnel-shaped member having a proximal end and a distal end with a predetermined length therebetween, said proximal end having a first diameter, said distal end having a second diameter; and
    means for dislodgeably engaging the barb end of a conventional fishing hook in said proximal end, said means for dislodgeably engaging including means for aligning the shank of the hook, said means for aligning defined as a substantially V-shaped slot placed in the outer surface of said proximal end, whereby said baited fishing hook is guarded from snagging or fouling by underwater vegetation through positioning said distal end of said guard against the body of the bait and placing said proximal end in juxtaposition with said barb end of said baited fishing hook, whereby said means for dislodgeably engaging said barb engages said guard in a fixed position providing a coherent structure between the bait and the barb of the hook, said guard dislodged by swallowing of the hook by a fish.

2. The guard according to claim 1, wherein said funnel-shaped member is further defined as a homogenous tube of molded, resilient, plastic material.

3. The guard according to claim 1, wherein said funnel-shaped member includes an angular bend between said proximal end and said distal end.

4. The guard according to claim 3, wherein said angular bend places said proximal end in a substantially horizontal parallel disposition in relation to the bait.

5. The guard according to claim 1, wherein said means for dislodgeably engaging said barb is further defined as a cavity disposed within said proximal end, said cavity including a means for conforming to the barb of a conventional fish hook and said means for aligning the shank of the hook.

6. The guard according to claim 5, wherein said means for conforming to the barb is defined as a detention for engaging the perpendicular shoulder and angular forward slope of the barb.

7. The guard according to claim 5, wherein said means for aligning the shank of the hook is further defined as being diametrically opposed to said means for conforming to the barb.

8. A fishing hook guard for use in combination with a baited fishing hook, said guard comprising:

an elongated homogenous tube of molded, resilient, plastic material shaped as a funnel member having a proximal end and a distal end with a predetermined length and angular bend therebetween, said proximal end having a first diameter defining a cavity with a detention placed therein for engaging the perpendicular shoulder and angular forward slope of the barb on a hook, the outer diameter of said proximal end having a substantially V-shaped slot for insertion of the shank of a hook for aligning the barb to said detention, said distal end having a second diameter sized less than said first diameter, whereby said baited fishing hook is guarded from snagging or fouling from underwater vegetation by positioning said distal end of said guard against the body of the bait and placing the shank of the hook into said V-shaped slot for aligning the barb end of said baited fishing hook in said detention for engaging said guard in a fixed position providing a coherent structure between the bait and the barb of the hook, said guard dislodged by swallowing of the hook by a fish.

* * * * *